United States Patent [19]

Lichtenberger et al.

[11] 4,310,922

[45] Jan. 12, 1982

[54] BIT SAMPLING MULTIPLEXER APPARATUS

[76] Inventors: W. Wayne Lichtenberger, 19337 Sakura Way, Cupertino, Calif. 95014; John R. Johnston, 56-419 Pikai St., Haleiwa, Hi. 96712

[21] Appl. No.: 110,803

[22] Filed: Jan. 10, 1980

[51] Int. Cl.³ .............................. H04J 3/16; H04J 3/06
[52] U.S. Cl. ....................................... 370/48; 370/82; 370/84; 370/91; 370/101; 370/112
[58] Field of Search ....................... 370/100, 48, 82, 84, 370/91, 112, 101

[56] References Cited

U.S. PATENT DOCUMENTS

| | | | |
|---|---|---|---|
| 3,566,365 | 2/1971 | Rawson et al. | 364/200 |
| 3,959,595 | 5/1976 | Smith | 370/82 |
| 4,052,567 | 10/1977 | MacKay | 370/101 |
| 4,097,695 | 6/1978 | Grace et al. | 370/92 |

FOREIGN PATENT DOCUMENTS 1022305  3/1966  United Kingdom ................ 370/101

OTHER PUBLICATIONS

IBM Technical Disclosure Bulletin, vol. 18, No. 10, Mar. 1976, pp. 3313-3314.

*Primary Examiner*—Douglas W. Olms
*Attorney, Agent, or Firm*—Fitch, Even, Tabin, Flannery & Welsh

[57] ABSTRACT

A bit-sampling multiplexer apparatus includes two terminals, each having a transmitter portion and a receiver portion. A transmitter in one terminal multiplexes data on a plurality of incoming data channels into a serial data frame, and couples this frame across a high-speed digital data communication line to the opposite terminal. The communication line comprises a physical twisted pair cable, optical fiber, or other suitable means for transporting digital data. Two separate lines are provided to enable communication in both directions between said terminals. The transmitter portion of each terminal periodically samples each of a plurality of data channels connected thereto at a rate significantly faster than the bit rate of each such channel, to generate the serial data frame. Each transmitter may also include an edge detector for generating a signal when a state change is detected in one or more high priority data channels. The transmitter acts in response thereto to truncate the data frame length so that said high priority data channel or channels is sampled again and a new data frame generated more quickly than would otherwise be the case.

16 Claims, 4 Drawing Figures

BIT SAMPLING MULTIPLEXER APPARATUS

This invention is directed generally to multiplexer devices and, more particularly, to an apparatus for multiplexing a plurality of data channels across a data communication line between a first and a second terminal at a rate faster than the bit rate of each such data channel.

Prior art data multiplexers have generally used one of two techniques for multiplexing data, either sending the various data one bit or one character at a time in fixed time slots (time-division multiplexing) or by sending only that data which has changed since a last scan of the various channels (statistical multiplexing). Either approach has its advantages and disadvantages; both however generally assume that the composite data—the serial data frame—will be sent on the communication line by some type of modem. Modems are necessary to transform the digital signal into signals compatible with telephone transmission equipment. The effect of this assumption is that all of these multiplexers will work independent of the length of the communication line. Many such multiplexers, however, are used in instances where the communications line is a direct wire of length no greater than one or two miles and frequently much less, such as between adjacent buildings or between floors in the same building. In these cases the use of a modem is doubly disadvantageous inasmuch as it represents almost all of the cost of the communications line, and it greatly reduces the data rate available to the multiplexer.

Conventional multiplexers often function at the character level, producing noticeable delay for slower terminals. Whether at the bit or character level, however, significant complexity is involved in receiving data from each data source—asynchronously or synchronously, interleaving it in some fashion, transmitting it in periodic frames, and reversing the process at the other end. This action is further complicated by the need for error correction procedures. Again in the case of a limited distance communications line, most of the normal sources of such errors are absent; hence such procedures are usually not needed.

So long as the communications line is capable of transferring composite data at a sufficiently high rate without the use of elaborate modems or other signal conditioning equipment, virtually any form of digital signal can be multiplexed by sampling it at a rate somewhat faster than the rate of change of the signal, placing the sample values in the composite data, and from this reconstructing the original signals at the other end, thereby enabling a greatly simplified multiplexing technique to be utilizable. This simplified multiplexing is usable on limited distance lines, e.g., between floors of buildings or between nearby buildings, distances of typically less than a mile or two, but greater than the distances which most equipment interfaces now would allow. Data transmission rates approaching one million bits per second are available on such limited distance communication lines.

Accordingly, it is a principal object of the present invention to multiplex a plurality of digital data channels onto a single data communication line by sampling each data channel at a rate substantially faster than the normal bit rate associated with that channel.

A further object of the present invention is to provide a multiplexer apparatus of inexpensive design and simple construction for limited distance data communication.

Another object of the present invention is to provide a limited distance digital multiplexer apparatus having the characteristic that it appears transparent to the data channels multiplexed by said apparatus; i.e., no changes need be made in the multiplexer to accommodate different bit rates or signalling conventions on the data channels.

A still further object of the present invention is to provide a digital multiplexer apparatus wherein the information on certain high priority data channels may be sampled at a faster rate than other lower priority data channels by varying the length of the serial data frame coupled across the data communication line.

These and other objects and advantages of the present invention will become more apparent upon reference to the following description and the accompanying drawings, in which.

Broadly stated, the present invention is directed to an apparatus for multiplexing signals from a plurality of data channels across a single data communication line between first and second terminals, including a transmitter portion in said first terminal having means for sampling the present state of each of said data channels connected thereto, at a rate significantly faster than the rate of change of data bits on each such data line, e.g., at least two and one-half times as fast, and for multiplexing said sampled states into a serial data bit string frame. Means are also provided for generating frame synchronization signals as part of said data frame and means for coupling said serial data frame and synchronization signals across said data communication line to said second terminal. Means are provided in said second terminal, responsive to said synchronization signals in a receiver portion thereof, for demultiplexing said serial data frame into a plurality of signals which are each stored and output by respective output storage latches, each latch output signal state being the same as the current state of the corresponding data channel as sampled by said first terminal.

Figure 1:
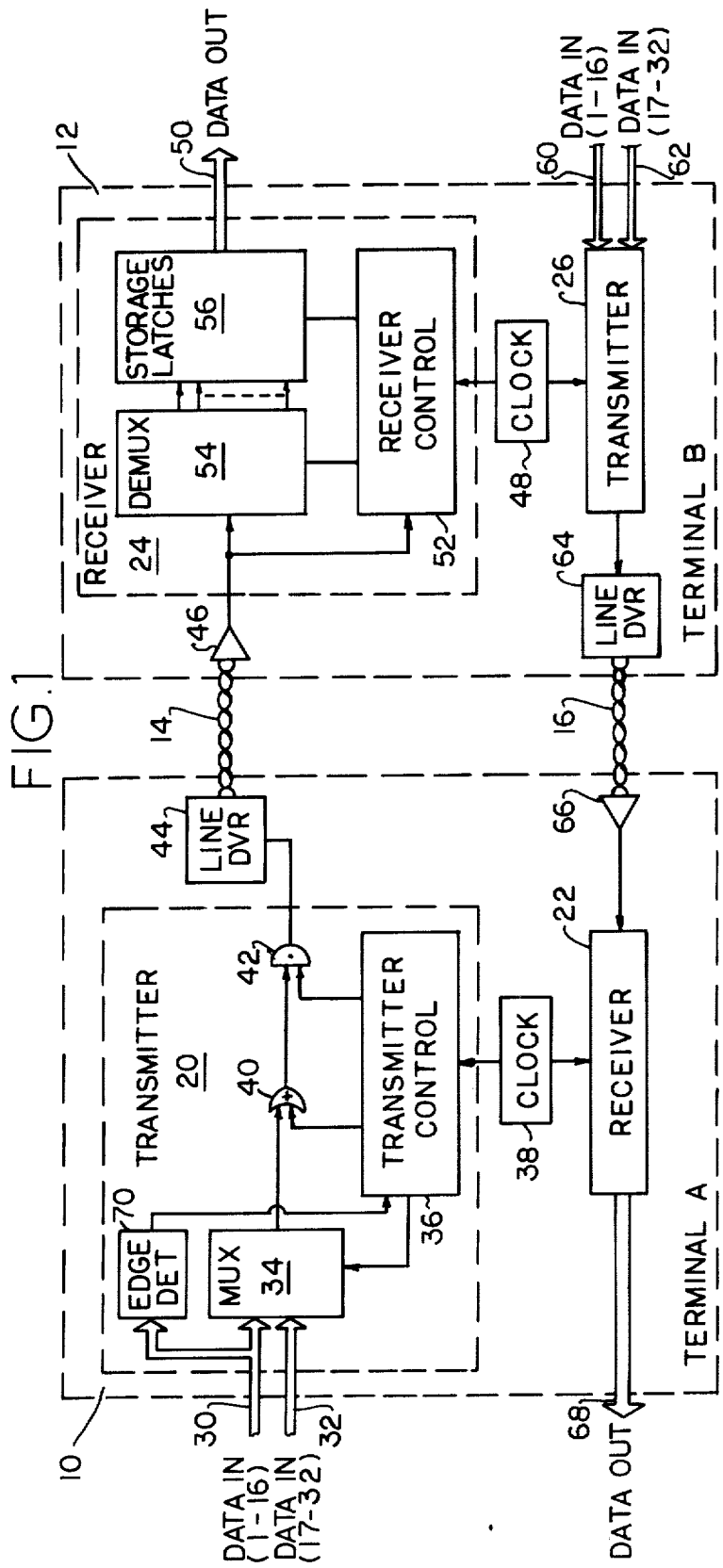
FIG. 1 is a block diagram of a two terminal asynchronous data line multiplexer/demultiplexer apparatus according to the present invention.

FIG. 1 illustrates a block diagram of a preferred embodiment of a multiplex system according to the present invention. As seen in FIG. 1, the present invention includes a first terminal A, shown at 10, and a second terminal B, shown at 12. These terminals A and B are interconnected by two data communication lines 14 and 16. Data communication line 14 is used to transmit a serial bit string of data from terminal A to terminal B, whereas data communication line 16 is used to transmit a serial bit string of data from terminal B to terminal A.

Each terminal A and B is divided up into two distinct parts, a transmitter portion and a receiver portion. In terminal A, the transmitter is indicated at 20 and the receiver at 22. In terminal B, the receiver is indicated at 24 and the transmitter at 26.

In the following discussion of the apparatus according to the present invention, only one transmitter in one terminal and a corresponding receiver in the second terminal will be described and shown in the drawings. Operation of the second data path is equivalent.

In operation, when digital data is to be transmitted in a direction from terminal A across data communication line 14 and terminal B, data is sampled from a plurality of data channels 30 and 32 connected to terminal A. These data channels 30, 32 are sampled by a multiplexer 34, which outputs a serial bit string frame to the data line 14 under the control of a transmitter control 36 and terminal A clock 38. The transmitter 36 causes the multiplexer to sample each data channel sequentially. Since each data channel is sampled many times during the duration of each data bit appearing thereon, the reconstruction of this signal in the receiver may be completed without regard to its particular data rate or signalling convention, i.e., it doesn't matter whether any given data channel uses parity with each character, uses a ten or an eleven bit code, etc.

The control 36 also generates frame synchronization pulses which are added to the bit string via gates 40 and 42 for output to data line 14. To drive the data communication line 14, the bit string from multiplexer 34, including the frame synchronization signals generated by transmitter control 36, are output through a conventional line driver 44 to the data communication line 14 for reception by a line receiver 46 in terminal B. The data communication line is preferably a conventional physical twisted pair cable, a co-axial cable, or an optical fiber, since reliability of this data path is need to be high.

Receiver 24 in terminal B, under the control of a terminal B clock 48, functions to demultiplex the transmitted bit string frame as synchronized by the frame synchronization signals. Receiver 24 outputs these signals on separate data channels 50 corresponding to data channels 30, 32 as connected to terminal A. As is seen, receiver 24 includes a demultiplexer 54, a storage register or latches 56 and a receiver control 52. Receiver control 52 controls the demultiplexing of the bit string frame received by line receiver 46 through control of said demultiplexer 54 and latches 56. Storage latches 56 comprise a plurality of separate storage locations, one for each demultiplexed data channel state, each location corresponding to a separate data channel coupled to terminal A. The outputs of latches 56 are coupled to respective data channels 50.

Data is transmitted in the opposite direction through the multiplexer apparatus according to the present invention across data communication line 16 in the same manner as just described. More specifically, data appearing on data channels 60 and 62 are coupled to transmitter 26 which, under the control of clock 48, multiplexes the sampled data states of these channels 60, 62 into a serial bit string frame which is fed to line driver 64 for transmission across data communication line 16 to a line receiver 66 in terminal A. The output of line receiver 66 is fed into receiver 22 which demultiplexes the serial bit string frame, as a function of the frame synchronization pulses therein, and updates the storage register therein corresponding to the storage register 56 in terminal B, for outputting from terminal A of data signals on data channels 68, each channel 68 corresponding to a separate data channel 60, 62 coupled to said second terminal.

The present invention preferably also includes the ability to treat certain of the data channels coupled through said system with a higher priority than a second set of data channels. Such an ability is desirable when certain data channels have a data rate faster than other data channels being serviced by the multiplexer apparatus according to the present invention. Such a situation exists, for example, when certain of the data channels are transmitting control data which tend to change state much more slowly than normal data channels. Therefore, in operation, the present invention acts to detect when a high priority data channel has changed state, and acts in response thereto under certain conditions to shorten the length of a bit string frame presently being transmitted across the date communication line associated therewith.

In terminal A, for example, as seen in FIG. 1, the high priority data channels are indicated at 30 and the low priority data channels are indicated at 32. Both sets of data channels 30, 32 are equally input to multiplexer 34, but high priority data channels 30 are also coupled to an edge detector 70. Edge detector 70 generates an output signal whenever any of said data channels 30 change state. This edge detector signal is communicated to the transmitter control 36 which responds by not multiplexing data states from any of the data channels 32 in the present serial data frame being transmitted across data communication line 14. Or, if such data channels 32 are presently being sampled and multiplexed, control 36 acts to cut short such sampling and immediately begins a new frame, thereby sampling the data channels 30 as part of this next frame more quickly than would otherwise be the case.

Transmitter 26 operates in a similar manner to treat data on channels 60 with a higher priority than data on channels 62, to generate a variable length bit string frame across data communication line 16 whenever a state change is detected in the high priority data channels 60.

As can be seen from the above, the method according to the present invention enables each given data channel input to the multiplexer apparatus to be sampled, multiplexed, coupled across a communication line, demultiplexed and distributed to storage means, wherein one storage location is provided for each data channel sampled. The demultiplexed samples are stored and output to respective data channels in the order to which they were originally sampled. Thus, the original digital wave-forms for each data channel are approximately reconstructed at the output of each storage location. The data channel signals are not reconstructed exactly since the original signals can change at any moment, whereas the reconstructed signals at the other end of the multiplexer system can change only when the next sampled state has been demultiplexed. This discrepancy, or data update delay, is insignificant if the sampling rate is substantially faster than the normal rate of change of data on such input data channels.

Because of the fixed sampling rate, the difference in time between when the original signal on a given input data channel in one terminal makes its transition and when the reconstructed signal transition occurs on the corresponding output data channel in the opposite terminal, relative to the width of a bit, becomes more pronounced as the data rate on that data channel increases. This gives rise to a form of signal distortion termed "sampling distortion," and this distortion becomes the ultimate channel data rate limitation of the present invention. Since UART's (Universal Asynchronous Receiver/Transmitter Circuits) are used almost universally in digital communication links for sending and receiving information asynchronously, the maximum sampling distortion tolerable by such units dictates the minimum sampling rate for each data channel, and thus the maximum number of data channels serviceable for a given data communication line bandwidth. The absolute minimum sampling rate would be of the order of two and one-half times as fast as said data channel rate of change. However, a faster sampling rate, assuming the bandwidth were available, would be preferred.

As an example, assume that each data channel is sampled at the rate of 4 samples made during each data channel bit period. This would create a sampling distortion of 25 percent for each such bit, which is tolerable since the UART can function with up to approximately 40 percent sampling distortion. Thus, if it is desired to multiplex 32 data channels, each running at a rate of 1200 bits per second (BPS), a data rate or bandwidth on the data communication line of $4 \times 1200 \times 32$, or 153,600 BPS is needed. If the data communication line has a capacity of one million bits per second, potentially 208 such data channels could be multiplexed at the 25 percent distortion rate.

Figure 2:
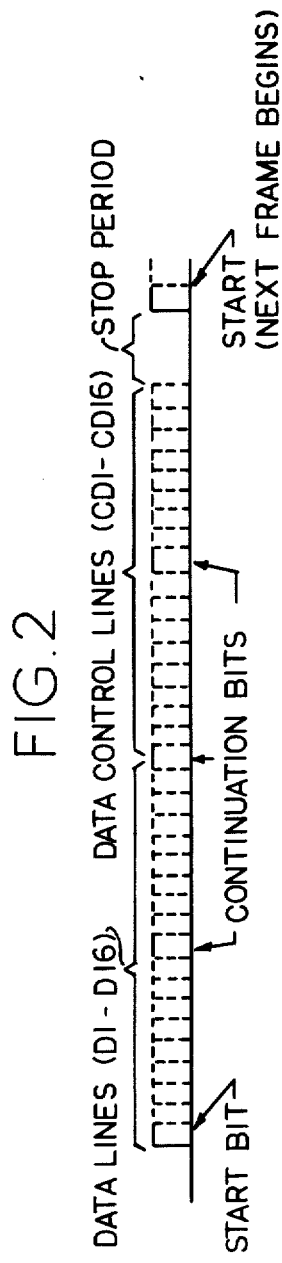
FIG. 2 illustrates an exemplary serial data frame, including frame synchronization signals, according to the present invention.

An exemplary serial data bit string frame, including frame synchronization pulses or bits, for a multiplexer apparatus according to the present invention, is shown in FIG. 2. In this embodiment, 16 high priority data channels (30 or 60), and 16 lower priority data control channels (32 or 62), for a total of 32 bits of data, are transmitted between terminals in a full length serial data frame. As seen in FIG. 2, a full length serial data bit string frame consists of the sampled states from the 16 high priority data channels and the 16 sampled states from the low priority data channels. The data frame is divided up into four 8 bit bytes or sub-frames, each proceded by an initial one bit. The one predecessor bit, the "start" bit, indicates to the receiver receiving the data frame that this is the beginning of the frame. The one bit that precedes each of the other three bytes of data are called "continuation" bits. The fourth data byte is followed by a "stop" gap or period of up to 9.5 bits in length, during which time the data value on the data communication line is zero. Then a new frame begins with another start bit, with this new frame having the same format as described above, unless it is shortened in response to certain conditions described hereinbelow.

Initially, the receiver (22 or 24) must become synchronized to this serial data frame to be able to read it without error. That is, it has to know when to look at the data communication line, to be able to read the data communication line and obtain the sampled data channel states in proper sequential order. The stop period enables the receiver to know when a new serial data frame is to begin. Since each data byte is 8 bits long and is separated from the other data bytes by one bit, the maximum number of zeros between the start bit and an adjacent continuation bit, and between adjacent continuation bits is 8 in a given frame. Consequently, extending the stop period beyond this 8-bit time and detecting this ninth zero, provides the receiver with the means by which it can synchronize to the next start bit. A more detailed description of the operation of a receiver (22 or 24) according to the present invention is discussed hereinbelow.

As mentioned above, the serial data frame may be shortened whenever an incoming high priority data channel makes a transition. The following criteria are used to determine how truncated the frame should be:

1. If the incoming high priority data channel makes a transition during the transmission of the first two subframes or bytes, those bytes which contain the high priority data channel states, then the last two bytes, which normally contain the low priority control data channels, are not transmitted. A new frame is begun after one and a half bits of zeros is transmitted at the end of the second byte of data. (Normally, a continuation bit would be found at this point.)

2. If no incoming high priority data channel makes a transition during the transmission of the first two bytes of data, but at least one channel does change state during the transmission of the third byte, then the fourth byte is not transmitted and a new frame is begun 1.5 zero bits after the end of the third byte.

3. If no incoming high priority data channel makes a transition during the transmission of the first three bytes of data, but at least one does change state during the transmission of the fourth byte, then the next frame is begun one and a half zero bits after the end of the fourth byte, i.e., the stop period is shortened from 9.5 bits in length to one and a half bits long.

4. If no incoming high priority data channel makes a transition during the transmission of any of the bytes of data, but at least one changes state during the following normal 9.5 bit stop period, then the next frame begins immediately with the stop period shortened accordingly.

Thus, it can be seen that the above criteria make possible relatively quick transmission of any state change in an incoming high priority data channel, while permitting low priority control data and frame synchronization information to be sent during idle moments. Therefore, the multiplexer apparatus according to the present invention transmits high priority data channel state changes at a much higher rate than would be possible if low priority relatively infrequently changing data channel states and synchronization pulses had to be included in every frame.

Figure 3:
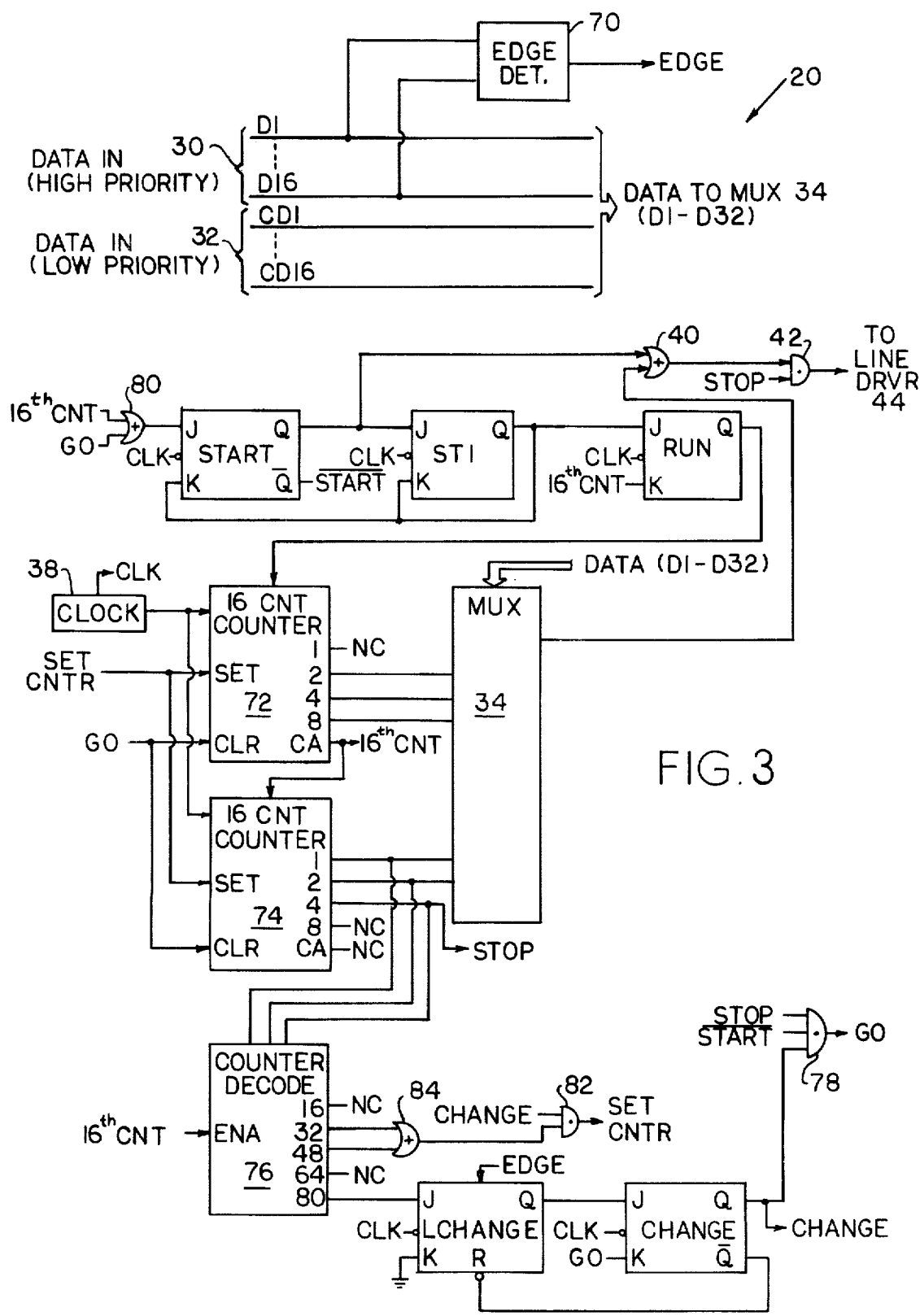
FIG. 3 is a more detailed block diagram illustrating the transmitter portion of a terminal according to the present invention.

A more detailed block diagram of a transmitter 20 including a multiplexer 34, an edge detector 70, and a transmitter control 36 according to the present invention, is illustrated in FIG. 3. As seen in FIG. 3, data from data channels 30 and 32 is coupled to multiplexer 34 for generation of the serial data string frame. The serial data frame is coupled out to line driver 44 and data communication line 14 via an OR gate 40 and an AND gate 42. The high priority data 30 (D1 to D16) is also fed to the edge detector 70 for generation of an edge pulse which is used to shorten the length of the serial data frame depending on when during the transmission of such frame the edge pulse is generated, as is described herein.

In summary, the clock 38 feeds two 16 count counters 72 and 74 which, along with 5 flip flops, START, ST1, RUN, LCHANGE, and CHANGE comprise the transmitter control 36 shown in the block diagram of FIG. 1. The counters 72 and 74 and the above mentioned flip flops generate the serial data frame and the required frame synchronization pulses, enabling proper receipt of the data frame by the receiver 24 at the other end of the data communication line 14. A counter decode 76 in combination with the LCHANGE and CHANGE flip flops provides the means to enable the serial data frames to be shortened in response to a detected high priority data channel state change, to thereby maximize the effective sampling rate while permitting low priority data on data channels 32, and frame synchronization stop gaps, to be sent when no changes in the high priority data states 30 have been sensed within the duration of a given generation of a serial data frame.

It is assumed for discussion purposes that the operation of the transmitter 20 begins with the setting of the START flip flop by a GO signal. The GO signal is generated by AND gate 78 when the existence of a CHANGE signal, a STOP signal and a $\overline{START}$ signal coincide. The CHANGE signal is generated when the CHANGE flip flop is activated, the $\overline{START}$ signal is generated when the START flip flop is off, and the STOP signal is generated by counter 74 after the 64th count has been reached in a given data frame generation sequence. The GO signal clears the two 8-bit counters 72 and 74, and the CHANGE and RUN flip flops at the next clock time. The GO signal causes the START flip flop to change state at this first clock time, to an on state, via an OR gate 80. Since the $\overline{START}$ signal goes off when the START flip flop goes on, this causes the GO signal to go off. Note also that the GO pulse also goes off due to the change of state of the CHANGE flip flop which is also caused by the existence of the GO signal. On the next clock pulse, the ST1 flip flip goes on in response to the on state of the START flip flop. At the next clock time, the ST1 flip flop sets the RUN flip flop while resetting itself and the START flip flop. This sequence causes the START flip flop to remain on for two clock times. This is outputted as a start bit to OR gate 40, and thereby to data communication line 14. This operation thus provides the means for generating the start bit for the next serial data frame.

As will be described below, the START flip flop also generates the continuation bit. It should be noted at this point that for every bit of information output to the data communication line 14, two clock 38 CLK pulses are generated. Therefore, the start bit is two clock bits long, as is every one of the data bits appearing in the serial data bit string frame, and counter 72 counts twice for each output data bit. Note that the least significant bit of counter 72 is consequently left unused. The purpose of this choice of clocking is to permit half-bits to be output at certain times as described hereinbelow.

The setting of the RUN flip flop enables the counting operation of counter 72. As just described, the clock 38 operates at twice the frequency of the bit transmission existing on the data communication line 14. The outputs of counter 72 and counter 74 are fed to the multiplexer 34. Therefore, as the counters advance, they cause the multiplexer to sample, every two clock times, the next data channel 30, 32 connected thereto, In the absence of the generation of a GO pulse, the operation of the counter 72 is periodic, with two clock counts of the START flip flop being on and 16 clock counts of the RUN flip flop being on, generating thereby a start or continuation bit on data communication line 14 followed by an eight data bit byte, with this sequence being repeated.

As can be seen, the distinction between a start and a continuation bit is merely the position of this bit in the data frame. That is, the one bit generated by the START flip flop which occurs immediately after the GO pulse is the start bit. The subsequent one bits generated by the START flip flip, until the next frame is generated, are continuation bits. Both the start and the continuation bits indicate the beginning of an 8-bit data word or "byte" on the data communication line 14.

The generation of continuation bits by the START flip flop is enabled by counter 72. Counter 72 counts 16 counts for every 8-bit byte of data outputted by the multiplexer 34 to the data communication line 14. After each 16th count, the count is carried over to the 16 count counter 74 which in the present embodiment can also count up to 16 counts. Counter 74 counts how many data bytes have been transmitted in a specific serial data frame. The 16th count signal (16th CNT), generated by counter 72, besides incrementing counter 74 also sets the START flip flop via OR gate 80 for generation of the next continuation bit in the data frame. It also resets the RUN flip flop to disable thereby counter 72 until the above described START flip flop, ST1 flip flop sequence is completed. In normal operation, when a GO pulse has not been generated to indicate a shortened data frame is to be transmitted, the 16 count counter 74 counts 4 counts in a given frame, i.e., four 8-bit bytes of data, corresponding to a final count of 64 clock pulses.

The 64th count marks the end of the data transmission portion of the serial data frame and the beginning of the transmission of the stop period or gap. This gap is used by the receiver 24 to synchronize its timing control circuitry to the next serial data frame if it had not yet been frame synchronized. As described above, the stop gap is generated to be at least 9 bits long, a string of zeros one bit longer than is otherwise possible in the data frame, since the data frame always has a start or continuation bit between each 8-bit byte of data.

Thus, during the 16 counts of clock 38 after the 64th count (corresponding to 8 data frame bits), the output line 4 of the 16 count counter 74 continues to generate a STOP signal. This STOP signal is fed to AND gate 42 to lock off the data frame output to zero independent of the output from OR gate 40. That is, the START flip flop is automatically prevented from outputting a continuation bit. This automatically maintains the data bit string frame in a zero condition for the minimum 9 bit counts, the 8-bit data frame and the clamped to zero continuation bit.

The counter decode 76 decodes the 80th clock count, corresponding to the end of the 8-bit data frame stop gap. When counter decode 76 is enabled by the 16th count from counter 72 it acts at the next clock time to change the state of the LCHANGE flip flop. At the next clock time, this causes the CHANGE flip flop to go on enabling the generation of the GO pulse via AND gate 78. Note that at this clock time the CHANGE flip flop also causes the LCHANGE flip flop to reset. With the GO pulse on, the cycle begins anew and the generation of a new serial data frame is begun as described above.

The transmitter control 36 circuitry operates somewhat differently when a state change edge is detected by the edge detector 70 as having occurred on one of the high priority data channels 30. As previously mentioned, this generates an EDGE pulse which causes control 36 to shorten the serial data frame and thereby shorten the time between samplings of the high priority data channels 30 by the multiplexer 34. The EDGE signal is fed to the LCHANGE flip flop and sets this flip flop so long as the CHANGE flip flop is off. The CHANGE flip flop prevents the LCHANGE flip flop from going on at the beginning of a given serial data bit string frame. The transmitter control 36 is set up so that the data frame is shortened only after the first two bytes of data corresponding to the transmission of the 16 high priority data channel states have been completed. As summarized previously, depending on when the state change is detected, the occurrence of the EDGE pulse will cancel transmission of one or both of the low priority data 8 bit bytes, and/or shorten the stop period at the end of the data frame.

In operation, when the LCHANGE flip flop is turned on by the EDGE signal, the CHANGE flip flop goes on at the next clock time, and outputs a CHANGE signal. This flip flop output does not generate a GO pulse since there is no STOP signal at present being coupled to AND gate 78. However, the CHANGE signal does enable an AND gate 82. This gate 82 is also fed from the counter decode 76 through an OR gate 84, which operates to couple the 32nd or the 48th count of counters 72, 74 to gate 82 to cause gate 82 to generate a SET CNTR pulse, once gate 82 has been enabled by the CHANGE signal. This corresponds to the end of the second or third data byte of the data frame.

The SET CNTR pulse acts to immediately cause both counters 72 and 74 to be converted to an all 1 state, i.e., corresponding to a count of 128. This automatically generates the STOP signal which starts the stop gap period, turns off the RUN flip flop, and ends further data transfer in the given data frame. This circuit thus operates to allow the transmission of a complete data byte before the data frame is terminated.

On the other hand, since the STOP signal is normally generated after the 64th count and the LCHANGE flip flop turned on after the 80th count to generate the stop gap, the above process is not enabled when an EDGE signal is generated after the 48th count. This is because in this latter case, the CHANGE flip flop has already been turned on by the LCHANGE flip flop. Thus, in this mode, as soon as the STOP signal is generated as a result of the setting of counters 72, 74, to all 1's, it causes AND gate 78 to generate the GO signal, thereby starting the next serial data frame.

Note that the above operation causes the stop gap to be truncated whenever a high priority data channel edge is detected, to a minimum bit length of one and one-half bits. This does not prevent the proper receipt of the data frame by the opposite terminal's receiver 24 so long as this receiver 24 is already synchronized to the data frames. As will be described in more detail below, this is because after the end of a given 8-bit data interval, the receiver 24 knows that the next one bit, even if received only after a one and a half bit length stop interval, is the start bit indicating the beginning of the next data frame. The receiver 24 only needs the 9-bit zero or stop interval when it has lost frame synchronization. The extra half-bit inserted by the transmitter after the 9-bit interval of zeros is to compensate for differences in clock rate between transmitter and receiver.

Figure 4:
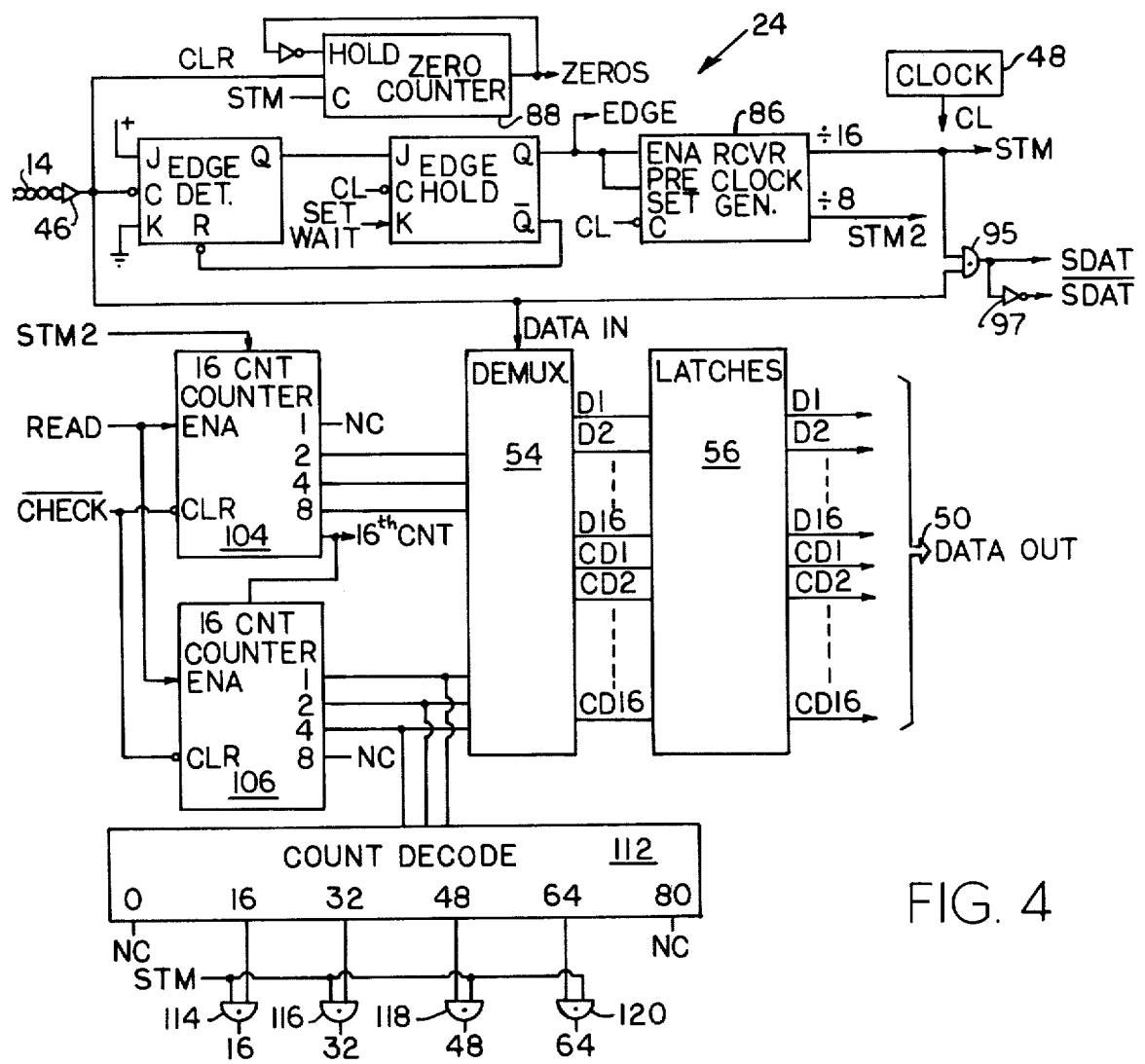
FIG. 4 is a more detailed block diagram illustrating the receiver portion of a terminal according to the present invention.
Figure 4:
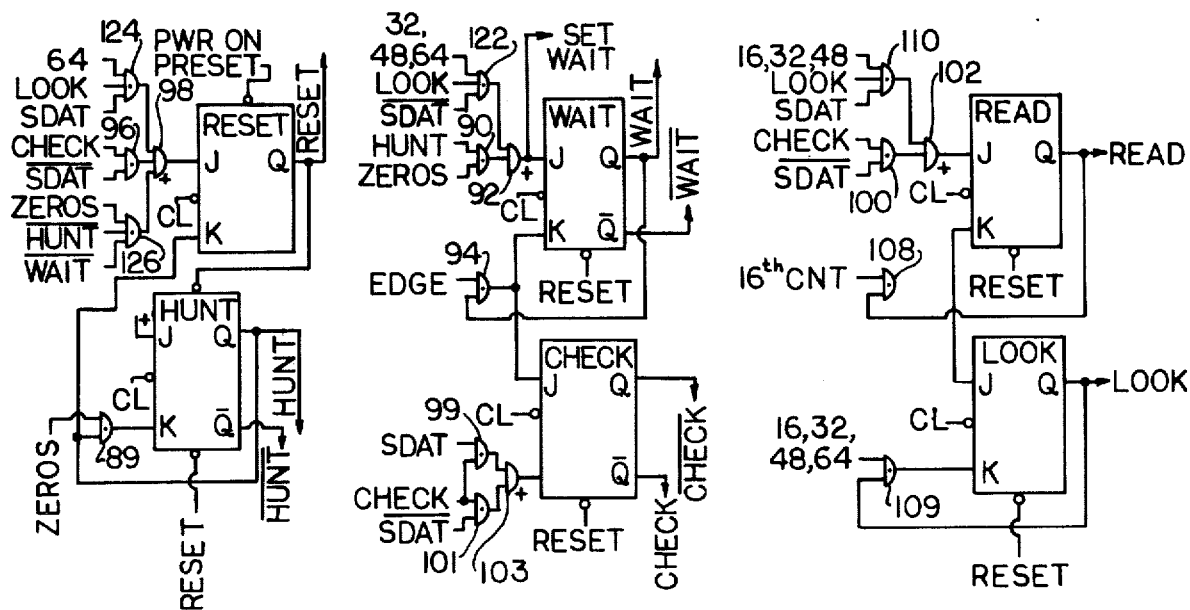

FIG. 4 illustrates a more detailed block diagram of a receiver 24 according to the present invention, including a demultiplexer 54, output storage latches 56, and receiver control circuitry therefor. As was described briefly above, the receiver 24 acts to demultiplex and output data from each serial data bit string frame received from terminal A over the data communication line 14. The serial data frame is received by the line receiver 46, demultiplexed in the demultiplexer 54, and outputted on output data channels 50 from storage latches 56.

The receiver 24 circuitry is somewhat more complex than the transmitter portion 20, since not only must the receiver 24 be in frame synchronization with the data being received from the data communication line 14, but also the bit position within a given frame must be synchronized. This latter requirement is needed since the clock 48 in the receiving terminal is not otherwise synchronized to the clock in the opposite terminal. Therefore, circuitry is also provided in the receiver 24 for ensuring that each bit on the data frame is read as close to the midpoint in that bit as possible.

Assuming first in the following discussion that the receiver is already in frame synchronization with the opposite terminal, bit synchronization in each data frame is accomplished by a receiver clock generator 86 in conjunction with an EDGE DETECTOR flip flop and an EDGE HOLD flip flop. These two flip flops work together as a signal synchronizer.

The EDGE DET. flip flop can be set with respect to the output CL of clock 48 after the occurrence of the rising edge of a bit which has been coupled to the J input of this flip flop from the data communication line 14 via the line receiver 46. Prior to the beginning of the next incoming data frame, the EDGE HOLD flip flop has been caused to go off by the SET WAIT signal, which indicated the end of the previous frame. This causes the receiver clock generator 86 to preset to an initial count of 8 and to hold at this count. Receiver clock generator 86 is a 16 count counter. The frequency of the CL clock pulse input thereto is such that generator 86 makes 16 complete counts in the expected length of time that each bit from the data frame is present on the data line 14. When the EDGE HOLD flip flop goes off, it also frees up the EDGE DET. flip flop so that it will now be activated by the next one bit from the data line 14, which should be the start bit of the next serial data frame. Thus, when a rising edge is detected by the EDGE DET. flip flop, it does activate, and at the next clock time CL, thereby causes the EDGE HOLD flip flop to go on. This enables the receiver clock generator 86 to begin counting. Once the EDGE HOLD flip flop has been set, it remains on for the duration of the present data frame begin input to the receiver 24. The EDGE HOLD flip flop, when it goes on, also resets and holds off the EDGE DET. flip flop until the EDGE HOLD flip flop is again reset by the next SET WAIT pulse.

When enabled by the EDGE HOLD flip flop, the receiver clock generator 86 outputs a stream of new clock pulses STM and STM2, which are respectively sixteen times slower and eight times slower than CL pulse generated by the clock 48. That is, an STM pulse is generated each time the generator reaches 16 counts, whereas an STM2 pulse is generated every eight counts. The STM frequency of occurrence corresponds approximately to the frequency of the incoming bits on the data communication line. STM2 occurs twice as fast. The pulse width of the STM and STM2 pulses is preferably the same and equal to the pulse width of the CL clock pulse.

As described above, since the counter 86 is begun in the middle of its 16 count range at count 8, and since it is caused to begin at this point almost immediately after the rising edge of the start bit pulse is detected from data line 14 via the line receiver 46, the STM clock pulse will be generated after eight more counts of generator 86, or in the center of the start bit. Thereafter, the STM pulse will occur approximately in the center of the rest of the data bits of the serial data frame following the start bit.

At the end of the serial data frame, the EDGE HOLD flip flop is caused to reset by the SET WAIT signal, and the cycle is repeated as described above.

As can be seen from the operation of the above bit synchronizer, this circuit insures that in spite of small differences in the frequency of clock pulses between opposite terminals in the multiplexer apparatus of the present invention, data within a given data frame will be sampled by the receiver 24 at an optimum time corresponding approximately to the midpoint of each data bit in the serial data frame. As can be seen, so long as the EDGE HOLD flip flop is reset at the proper time by the SET WAIT signal, which is generated as described hereinbelow, then bit synchronization will be updated by receiver 24 at the start of each new data frame.

Frame synchronization is accomplished by detecting when 9 consecutive zero bits are detected by the receiver 24 on the data communication line 14. Once the receiver 24 detects more than 8 zero bits, it knows that the next one bit on the data communication line 14 is the start bit of the next frame. The receiver 24 can then synchronize itself with this new start bit. The frame synchronization circuitry includes a zero counter 88 and six additional flip flops indicated as the RESET, HUNT, WAIT, CHECK, READ and LOOK flip flops. For explanatory purposes, it is assumed that the RESET flip flop has been just set by one or more error conditions, or in response to a power-on condition. The RESET flip flop assures that only one of the other above-mentioned five flip flops will be set at any given time. The RESET flip flop accomplishes this by presetting the HUNT flip flop to its actuated state and causing all the other flip flops to be reset to their off state. At the next CL clock time, the HUNT flip flop causes the RESET flip flop to go off. If for any reason more than one of the other flip flops is ever in an on condition at the same time, this will also provide a condition under which the RESET flip flop will be caused to go on to again reset the WAIT, CHECK, READ and LOOK flip flops to their off state and to preset the HUNT flip flop.

The HUNT flip flop, when on, indicates that the receiver has lost frame synchronization. That is, with the HUNT flip flop on, the receiver indicates to its circuitry that it does not know when the next frame is to begin, or whether it has already begun. Thus, only when the zero counter 88 indicates that at least 9 zeros have been detected on the data communication line 14, by generating a ZEROS pulse, will the HUNT flip flop be reset and the receipt of data from the following data frame begun by receiver 24.

Referring briefly to the operation of the zero counter 88, it is caused to be incremented in count upon the occurrence of each STM clock pulse which is coupled to it. This counting continues so long as the data bit sensed at that STM clock time is a zero bit. Counter 88 is automatically cleared by any one bit appearing on the data communication line 14. Thus, so long as a one pulse appears on the data communication line prior to the time zero counter 88 reaches its 9th count, the counter 88 is reset to zero. Once the zero counter has reached its 9th count and the ZEROS signal generated thereby, the ZEROS signal is fed back to the hold input of the zero counter 88, to cause the ZEROS signal to be maintained until the next one pulse is received on the data communication line 14. This is to prevent the zero counter 88 from continuing to count up from 9 and thereby discontinuing the ZEROS signal prematurely, i.e., prior to the receipt of a one pulse.

As seen in FIG. 4, the ZEROS signal is ANDed by AND gate 90 with the HUNT signal, generated when the HUNT flip flop is actuated, to turn on the WAIT flip flop through OR gate 92. The ZEROS signal also acts at the same CL clock time to reset the HUNT flip flop by means of AND gate 89. The WAIT state, outputted when the WAIT flip flop is actuated, denotes that the receiver 24 has finished a given frame, or has just gotten in frame synchronization, and is waiting for the next frame to begin.

As can also be seen, the SET WAIT signal is generated by the output of OR gate 92, to thereby reset the EDGE HOLD flip flop and begin the bit synchronization process as above-described. The WAIT flip flop remains set until receipt of an EDGE signal which is output by the EDGE HOLD flip flop when it is in its actuated state. AND gate 94 ensures that the WAIT flip flop is reset when this EDGE signal is received, and also acts to actuate the CHECK flip flop.

The CHECK flip flop is designed to permit the receiver 24 to verify that a start bit pulse has been detected by the EDGE DETECTOR flip flop. It does this by verifying, when the next STM pulse is generated, that a one is still being coupled to the receiver 24 from the data communication line 14. If this is not the case, the receiver 24 would otherwise be basing its frame synchronization and the start of a frame on a noise spike, for example, thereby possibly beginning a long sequence of errors. Thus, the CHECK flip flop checks to determine that in fact an entire start pulse is being communicated to the receiver 24.

In operation, to ensure that the data line 14 is only looked at for determining if a specific flip flop should be actuated, the STM pulse is ANDed to the output of line receiver 46 to generate the SDAT pulse and via an inverter 97 to generate the $\overline{SDAT}$ pulse. Therefore, if the incoming data line is zero, i.e., $\overline{SDAT}$ on, and the CHECK flip flop is in its actuated state, when the next STM clock pulse is generated, the receiver 24 via AND gate 96 and OR gate 98 detects the fact that the start bit is missing and proceeds to actuate the RESET flip flop. This passes receiver 24 control back to a reset condition and thereafter to the actuation of the HUNT flip flop.

When the CHECK flip flop actuation has been by a normal start bit pulse, i.e., SDAT on, then at the next CL clock time after STM is generated, the READ flip flop is actuated via AND gate 100 and OR gate 102. The CHECK flip flop is immediately reset just as the above tests take place. This resetting is accomplished via AND gates 99 and 101 and OR gate 103, as shown in FIG. 4.

When the READ flip flop is actuated, it indicates the receiver 24 state wherein the loading of incoming data to demultiplexer 54 and storage latches 56 is performed by the receiver 24. Actuation of the READ flip flop also implicitly indicates that both bit and frame synchronization has now been completed. Thus, the READ signal outputted by the READ flip flop enables two 16 count counters 104 and 106 to begin counting the bits in the data frame in a similar manner to the way in which the bit string frame was originally generated. The output of these counters 104, 106 is coupled to the demultiplexer 54 to thereby control the demultiplexing of data received from the data communication line 14 and line receiver 46. As with the transmitter 20, the counters 104, 106 count twice as fast as the bit rate of data on the data communication line. Thus, the STM2 clock pulse is coupled to the 16 count counter 104 which begins to count once it is enabled by the READ signal. As the counter 104 goes through its 16 counts, its output lines direct the demultiplexer 54 and latches 56 to sequentially demultiplex and store bits 0–7 from the first data byte appearing on the serial data frame.

As is known from the above discussion, at the end of the first data byte a continuation bit is generated on the data frame. Counter 104 generates a 16th COUNT signal and proceeds to update the counter 106 by one count. This places the counter 104 again at its 0 count value. The 16th COUNT signal also resets the READ flip flop and sets the LOOK flip flop via AND gate 108. AND gate 108 had been previously enabled when the READ flip flop was actuated. The function of the LOOK flip flop is to allow the receiver 24 to detect the presence of the continuation bit, or alternatively, if no continuation bit is sensed, to indicate that the frame has ended. The LOOK flip flop only remains on for one bit time. It is reset via AND gate 109 on the next clock time after the 16, 32, 48, or 64th count is generated by decode 112. If a continuation bit is detected, an SDAT pulse is generated, which causes AND gate 110 to actuate, thereby again actuating the READ flip flop through OR gate 102. With the READ flip flop again in its actuated state, the next eight data bits on the data frame are read into the demultiplexer 54 via counters 104 and 106 as previously described.

AND gate 110, as well as other AND gates to be described below, are caused to actuate only when specific counts of the counters 104, 106 are coupled thereto. These counts are decoded by a count decode 112 which has as its inputs the output of three lower significance bits of counter 106. These bits indicate a new count each time counter 104 reaches 16 counts. Thus, decode 112 generates a separate pulse when counter 106 indicates that 16 counts, 32 counts, 48 counts and 64 counts have been completed by the counters 104, 106. Each of these count pulses represents twice as many counts as the number of bits read off the data frame, but since each data bit is read in for every two counts, these count pulses respectively correspond to the receipt by the receiver 24 of the first 8-bit byte, the second 8-bit byte, the third 8-bit byte, and finally the last 8-bit byte of data from the 32 bit data frame. These count pulses are outputted from decoder 112 at each STM clock time via AND gates 114–120. These output count pulses are indicated as 16, 32, 48 and 64.

If a continuation bit is not detected at the end of a given 8-bit byte of data, AND gate 110 is not actuated, since no SDAT pulse is generated. An $\overline{\text{SDAT}}$ pulse, however, is generated instead, causing AND gate 122 to actuate. AND gate 122 actuates OR gate 92 which as a result actuates the WAIT flip flop, indicating thereby the end of the data frame. A continuation bit will always be sensed between the first and second data bytes of data in the preferred embodiment, since both initial bytes of data are high priority data channel sampled signals, and are always coupled to the demultiplexer 54 prior to the generation by a transmitter 20 of a new data frame. Thus, AND gate 122 is only actuatable after this second data byte of data has been completely demultiplexed, corresponding to count 32 from the count decode 112.

When the WAIT flip flop has again been actuated, indicating thereby the end of the present serial data frame, it causes the receiver 24 to wait for detection of the next start pulse as above described.

The RESET flip flop is also actuated when certain other error conditions have been sensed in addition to the previously mentioned condition where a noise spike is read in as a start pulse resulting in the failure of the CHECK flip flop to actuate, which causes the RESET flip flop to actuate via the actuation of AND gate 96. AND gate 124 causes the RESET flip flop to actuate via OR gate 98 whenever, on the 64th count, the LOOK flip flop is actuated and yet a data pulse is being detected from the data communication line 14. Such a one pulse would be an error, since a stop gap must be provided after the four data bytes have been received, to provide to the receiver 24 proper frame synchronization. This stop period is needed so that the receiver 24 will be enabled to start properly when the next start pulse is detected from the data communication line 14.

Similarly, AND gate 126 causes the RESET flip flop to actuate via OR gate 98 whenever both the HUNT and WAIT flip flops are in an unactuated state, and yet the ZERO signal is being generated by the zero counter 88. Such an error condition would occur, for example, if the READ flip flop remained actuated at the end of a given data byte interval, or if the WAIT flip flop failed to actuate when a continuation bit was not detected.

It is to be understood that the foregoing description merely illustrates the preferred embodiment of the present invention, and that various modifications, alternatives and equivalents thereof will become apparent to those skilled in the art. Accordingly, the scope of the present invention should be defined by the appended claims and equivalents thereof.

What is claimed:

1. A method for multiplexing signals from a plurality of data channels across a data communication line between a first terminal and a second terminal wherein said data channels include a plurality of high priority channels and a plurality of low priority channels comprising the steps of:
    (a) periodically sampling the state of each of said plurality of data channels coupled to said first terminal at a rate substantially faster than the rate of change of data bits on each data channel;
    (b) multiplexing said sampled data channel states into a serial bit string data frame;
    (c) adding a frame synchronization signal to said data frame;
    (d) coupling said serial data frame across said data communication line from said first terminal to said second terminal at a rate such that the sampled state obtained from each data channel can be serially coupled to said second terminal before the next sampling of each such data channel is made;
    (e) demultiplexing said serial data frame into separate data channel states in said second terminal as a function of said frame synchronization signal in said data frame;
    (f) storing each said data channel state in an output storage latch, each latch outputting a signal having the same state as the corresponding data channel as sampled by such first terminal;
    (g) detecting a change of state in one or more of said high priority data channels; and
    (h) in response to said detected state change, eliminating from the data frame presently being generated the low priority data channel states not yet multiplexed into said data frame.

2. The method of claim 1 further comprising the steps of:
   (a) periodically sampling the state of each of a plurality of data channels coupled to said second terminal at a rate substantially faster than the rate of change of data bits on each data channel;
   (b) multiplexing said sampled second terminal data channel states into a second serial bit string data frame;
   (c) adding a frame synchronization signal to said second data frame;
   (d) coupling said second terminal serial data frame across a second data communication line from said second terminal to said first terminal at a rate such that the second terminal sampled state obtained from each data channel is serially coupled to said first terminal before the next sampling of each such second terminal data channel is made;
   (e) demultiplexing said second terminal serial data frame into separate data channel states in said first terminal as a function of said frame synchronization signal in said second data frame; and
   (f) storing each said second terminal data channel state in an output storage latch in said first terminal, each latch outputting a signal having the same state as the corresponding data channel as sampled by said second terminal.

3. The method of claim 1 wherein said substantially faster sampling rate of step (b) is at least two and a half times as fast as the rate of change of data bits on each data channel.

4. A method for multiplexing signals from a plurality of data channels across a data communication line between a first terminal and a second terminal comprising the steps of:
   (a) periodically sampling the state of each of said plurality of data channels coupled to said first terminal at a rate substantially faster than the rate of change of data bits on each data channel;
   (b) multiplexing said sampled data channel states into a serial bit string data frame;
   (c) adding a frame synchronization signal to said data frame, including the steps of (i) beginning each said data frame with a start bit; (ii) generating a continuation bit in said frame between each of a plurality of data bytes multiplexed into said data frame, each said data frame byte having a preselected equal number of data state bits, each bit representing the current sampled state of a given data channel; and (iii) generating a stop gap in said data frame of a bit length longer than the bit length of any said data byte, said stop gap indicating to said second terminal the end of the serial data frame;
   (d) coupling said serial data frame across said data communication line from said first terminal to said second terminal at a rate such that the sampled state from each data channel can be serially coupled to said second terminal before the next sampling of such data channel is made;
   (e) demultiplexing said serial data frame into separate data channel states in said second terminal as a function of said frame synchronization signal in said data frame, including the steps of (i) detecting the rising edge of the start bit at the beginning of each said data frame; (ii) presetting a counter to a count equal to one-half its maximum count; (iii) enabling said counter to begin counting once said leading edge is detected, said counter thereafter counting to its maximum and beginning a new count from zero at a time approximately midway between the beginning and the end of the start bit, and each subsequent bit in said data frame; (iv) generating a clock pulse each time said counter counts to its maximum; and (v) demultiplexing said serial data frame by detecting at each such clock pulse time the present state of said data frame and sequentially outputting said detected state on a separate channel connected to a respective storage latch; and
   (f) storing each said data channel state in its said respective storage latch, each latch outputting a signal having the same state as the corresponding data channel as sampled by said first terminal.

5. A method for multiplexing signals from a plurality of data channels across a data communication line between a first terminal and a second terminal wherein said data channels include a plurality of high priority channels and a plurality of low priority channels comprising the steps of:
   (a) periodically sampling the state of each of said plurality of data channels coupled to said first terminal at a rate substantially faster than the rate of change of data bits on each data channel;
   (b) multiplexing said sampled bit data channel states into a serial bit string data frame, including the steps of (i) multiplexing in said data frame first said high priority channel sampled states and then said low priority channel sampled states; (ii) detecting if a change of state occurs in one or more of said high priority data channels during said multiplexing; and (iii) in response to said detected state change, eliminating from the data frame presently being generated the data bytes of low priority data channel states not yet multiplexed into said data frame;
   (c) adding a frame synchronization signal to said data frame, including the steps of (i) beginning each said data frame with a start bit; (ii) generating a continuation bit in said data frame between each of a plurality of data bytes multiplexed into said data frame, each said data byte having a preselected equal number of data state bits, each bit representing the current sampled state of a given data channel; and (iii) generating a stop gap in said data frame of a bit length longer than the bit length of any said data byte, said stop gap indicating to said second terminal the end of the serial data frame;
   (d) coupling said serial data frame across said data communication line from said first terminal to said second terminal at a rate such that the sampled state obtained from each data channel can be serially coupled to said second terminal before the next sampling of each such data channel is made;
   (e) demultiplexing said serial data frame into separate data channel states in said second terminal as a function of said frame synchronization signal in said data frame; and
   (f) storing each said data channel state in an output storage latch, each latch outputting a signal having the same state as the corresponding data channel as sampled by said first terminal.

6. The method of claim 5 further comprising the step of:
   truncating in response to said detected state change the bit length of said stop gap.

7. An apparatus for multiplexing signals from a plurality of data channels across a single data communication line between first and second terminals, wherein said plurality of data channels includes a plurality of high priority channels and a plurality of low priority channels, comprising:

- multiplexing means in said first terminal for sampling the present state of each of said plurality of data channels coupled to said first terminal at a rate substantially faster than the rate of change of data bits on each data channel, and for multiplexing said sampled states into a serial data bit string frame;
- means in said first terminal for generating a frame synchronization signal on said data communication line as part of said serial data frame;
- means for coupling said serial data frame across said data communication line from said first terminal to said second terminal;
- edge detector means in said first terminal for detecting when one or more of said high priority channels changes state during the time that a given data frame is being multiplexed by said multiplexer means and for outputting a state change signal in response thereto;
- means in said first terminal responsive to said state change signal for truncating the length of said data frame once said high priority data states in said frame have been coupled across data communication line;
- means in said second terminal responsive to said frame synchronization signal for demultiplexing said serial data frame into separate data channel states; and
- latch means in said second terminal including a plurality of latches, one for storing each said data channel state and for outputting a signal having the same state as the corresponding data channel as sampled by said first terminal.

8. An apparatus for multiplexing signals from a plurality of data channels across a single data communication line between first and second terminals comprising:

- multiplexer means in said first terminal for sampling the present state of each of said plurality of data channels coupled to said first terminal at a rate substantially faster than the rate of change of data bits on each data channel, and for multiplexing said sampled states into a plurality of data bytes in a serial data bit string frame, each said byte defined to include a preselected equal number of data channel state bits, each bit representing the current sampled state of a given data channel;
- means in said first terminal for generating a frame synchronization signal on said data communication line as part of said serial data frame, including: (i) means for generating a start bit on said data communication line for indicating to said second terminal the start of the serial data frame; (ii) means for generating one or more continuation bits between each of said plurality fo data bytes multiplexed by said multiplexer means in said data frame; (iii) means for generating a stop gap in said data frame after the last data byte is multiplexed into said data frame, said stop gap defined to extend in said data frame for a bit length longer than the bit length of a given said data byte;
- means for coupling said serial data frame across said data communication line from said first terminal to said second terminal;
- means in said second terminal responsive to said frame synchronization signal for demultiplexing said serial data frame into separate data channel states, including (i) means for detecting said stop gap and for beginning in response thereto the demultiplexing of said serial data frame when said second terminal detects the next start bit on said data communication line; and (ii) means for detecting the rising edge of the start bit at the beginning of each said data frame; (iii) counter means preset to a count equal to one-half its maximum count; (iv) means responsive to the detection of said start bit rising edge for enabling said counter means to count at a rate such that said counter counts to its maximum at a time approximately midway between the beginning and the end of the start bit and thereafter at approximately the same point during each subsequent bit in said data frame; (v) means for generating a clock pulse each time said counter counts to its maximum; and (vi) means at each said clock pulse time for sequentially outputting on separate lines the present state of the data frame;
- latch means in said second terminal including a plurality of latches, one for storing each of said data channel state as output by its corresponding output line, and for outputting a signal having the same state as the corresponding data channel as sampled by said first terminal.

9. An apparatus for multiplexing signals from a plurality of data channels across a single data communication line between first and second terminals comprising:

- multiplexer means in said first terminal for sampling the present state of each said plurality of data channels coupled to said first terminal at a rate substantially faster than the rate of change of data bits on each data channel, and for multiplexing said sampled states into a plurality of data bytes in a serial bit string frame, each said byte defined to include a preselected equal number of data channel state bits, each bit representing the current sampled state of a given data channel;
- means in said first terminal for generating a frame synchronization signal on said data communication line as part of said serial data frame, including: (i) means for generating a start bit on said data communication line for indicating to said second terminal the start of the serial data frame; (ii) means for generating one or more continuation bits between each of said plurality of data bytes multiplexed by said multiplexer means in said data frame; and (iii) means for generating a stop gap in said data frame after the last data byte is multiplexed into said data frame, said stop gap defined to extend in said data frame for a bit length longer than the bit length of a given said data byte; and wherein said multiplexer means further comprises (i) a first counter for counting the number of data channel states in a given data byte; (ii) second counter means for counting the number of data bytes multiplexed into said data frame; and (iii) means responsive to said first and second counter means for indicating a predetermined maximum count equal to the predetermined number of data states to be multiplexed in a given data frame; said stop gap generating means including means responsive to said maximum count indication for locking off the output of said multiplexer means in said frame synchronization signal generaling means;

means for coupling said serial data frame across said data communication line from said first terminal to said second terminal;

means in said second terminal responsive to said frame synchronization signal for demultiplexing said serial data frame into separate data channel states, including means for detecting said stop gap and for beginning in response thereto the demultiplexing of said serial data frame once said second terminal detects the next start bit on said data communication line; and latch means in said second terminal including a plurality of latches, one for storing each said data channel state and for outputting a signal having the same state as the corresponding data channel as sampled by said first terminal.

10. The apparatus of claim 9 wherein said data communication line comprises a twisted-pair cable.

11. A method for multiplexing signals from a plurality of data channels across a data communication line between a first terminal and a second terminal, wherein said data channels include a plurality of high priority channels and a plurality of low priority channels, comprising the steps of:

(a) periodically sampling the state of each said plurality of data channels coupled to said first terminal at a rate substantially faster than the rate of change of data bits on each data channel;

(b) multiplexing said sampled data channel states into a plurality of data bytes in a serial bit string data frame each said data byte having a preselected equal number of data state bits, each bit representing the current sampled state of a given data channel;

(c) adding a frame synchronization signal to said data frame including the steps of (i) beginning each said data frame with a start bit; (ii) generating a continuation bit in said data frame between each of said plurality of data bytes multiplexed into said data frame; and (iii) generating a stop gap in said data frame of a bit length longer than the bit length of any said data byte, said stop gap indicating to said second terminal the end of the serial data frame;

(d) detecting if a change of state occurs in one or more of said high priority data channels during said multiplexing;

(e) truncating in response to said change of state detection the length of said data frame once said high priority data channel states in said frame have been coupled across said data communication line;

(f) coupling said serial data frame across said data communication line from said first terminal to said second terminal at a rate such that the sampled state obtained from each channel can be serially coupled to said second terminal before the next sampling of each such data channel is made;

(g) demultiplexing said serial data frame into separate data channel states in said second terminal as a function of said frame synchronization signal in said data frame; and (h) storing each data channel state in an output storage latch, each latch outputting a signal having the same state as the corresponding data channel as sampled by said first terminal.

12. The method of claim 11 wherein step (e) further includes the step of truncating the bit length of said stop gap in response to said change of state detection.

13. The method of claim 11 wherein said step of demultiplexing said serial data frame includes the step of detecting, once frame synchronization has been obtained in said second terminal, the absence of a continuation bit at the end of a data byte; and detecting in response thereto the next pulse on said data communication line as the start bit of the next data frame.

14. An apparatus for multiplexing signals from a plurality of data channels across a single data communication line between first and second terminals, wherein said plurality of data channels includes a plurality of high priority channels and a plurality of low priority channels, comprising:

multiplexer means in said first terminal for sampling the present state of each of said plurality of data channels coupled to said first terminal at a rate substantially faster than the rate of change of data bits on each data channel, and for multiplexing said sampled states into a plurality of data bytes in a serial data bit string frame, each said byte defined to include a preselected equal number of data channel state bits, each bit representing the current sampled state of a given data channel;

means in said first terminal for generating a frame synchronization signal in said data communication line as part of said serial data frame, and including (i) means for generating a start bit on said data communication line for indicating to said second terminal the start of the serial data frame; (ii) means for generating one or more continuation bits between each of said plurality of data bytes multiplexed by said multiplexer means into said data frame; and (iii) means for generating a stop gap in said data frame after the last data byte is multiplexed into said data frame, said stop gap defined to extend in said data frame for a bit length longer than the bit length of any said data byte;

means for coupling said serial data frame across said data communication line from said first terminal to said second terminal;

edge detector means in said first terminal for detecting when one or more of said high priority channels changes state during the time that a given data frame is being multiplexed by said multiplexer means and for outputting a state change signal in response thereto;

means in said first terminal responsive to said state change signal for truncating the length of said data frame once said high priority data channel states in said frame have been coupled across said data communication line; and means in said second terminal responsive to said frame synchronization signal for demultiplexing said serial data frame into separate data channel states, including means for detecting said stop gap and for beginning in response thereto the demultiplexing of the next serial data frame when said second terminal detects the next start bit on said data communication line.

15. The apparatus of claim 14 wherein said truncating means includes means for truncating the bit length of said stop gap in response to said state change signal.

16. The apparatus of claim 14 wherein said means for detecting said stop gap in said second terminal includes means for detecting the absence of a continuation bit at the end of any said data byte and means responsive thereto for recognizing the next bit on said data communication line as the start bit of the next serial data frame.

* * * * *